Siegfried Baumgärtner
Hubert Kindler
Rolf Lidl
Heinrich Boden
Inventors.

By Karl J. Ross
Attorney

Siegfried Baumgärtner
Hubert Kindler
Rolf Lidl
Heinrich Boden
Inventors.

By Karl J. Ross
Attorney

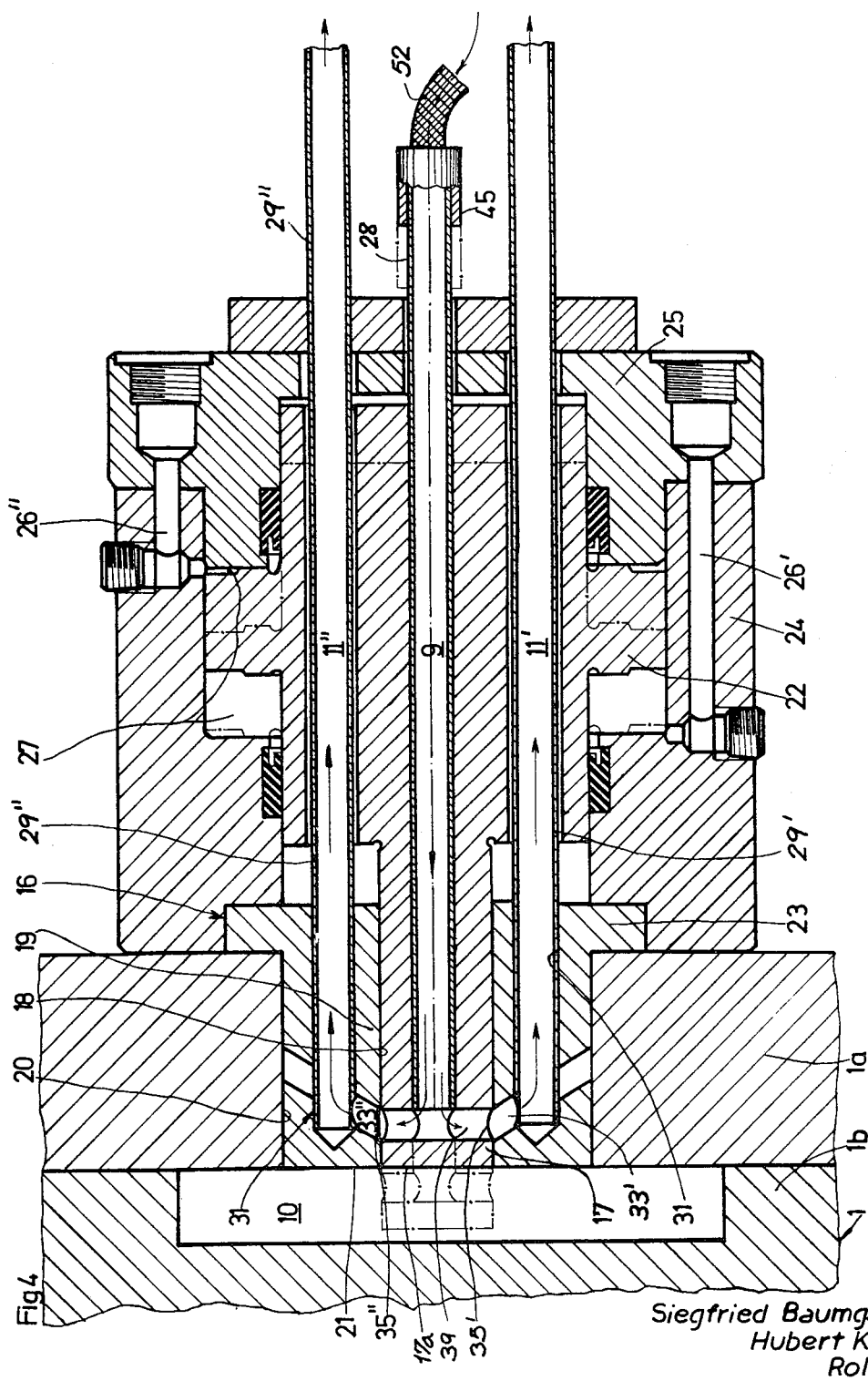

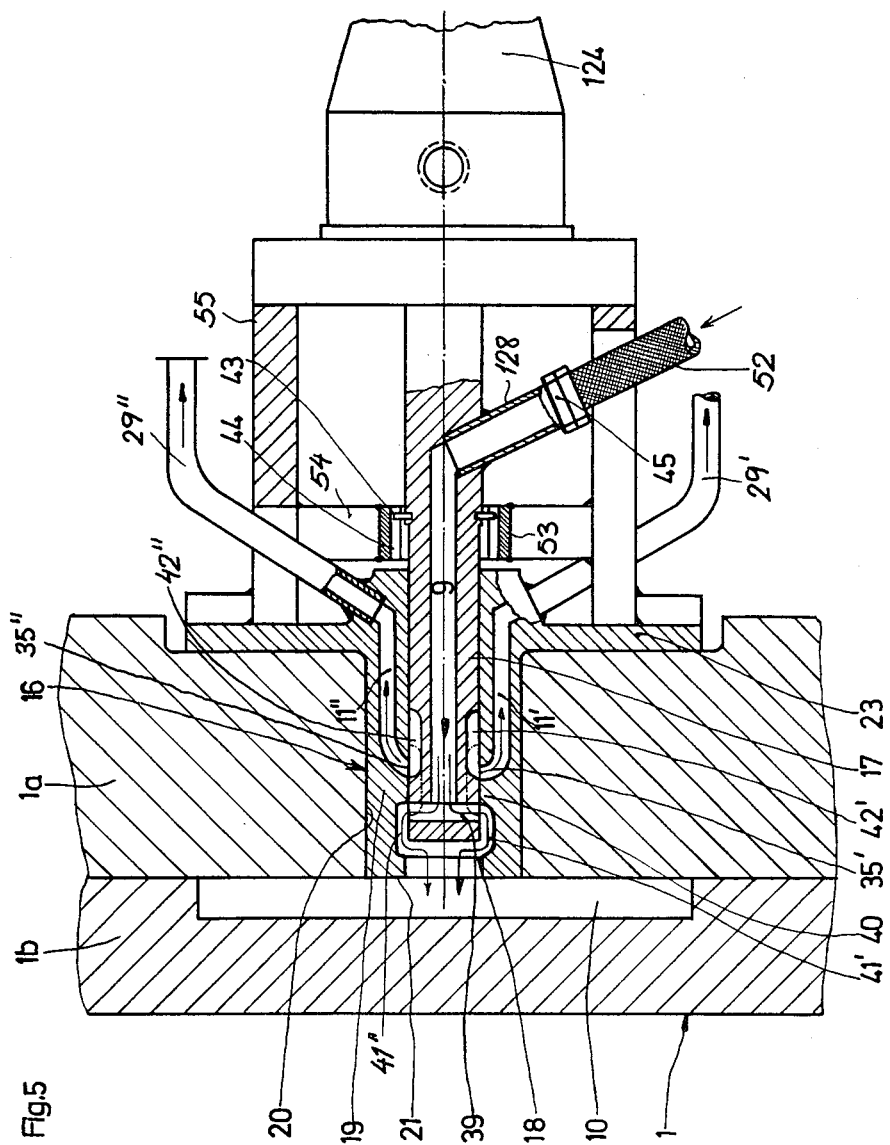

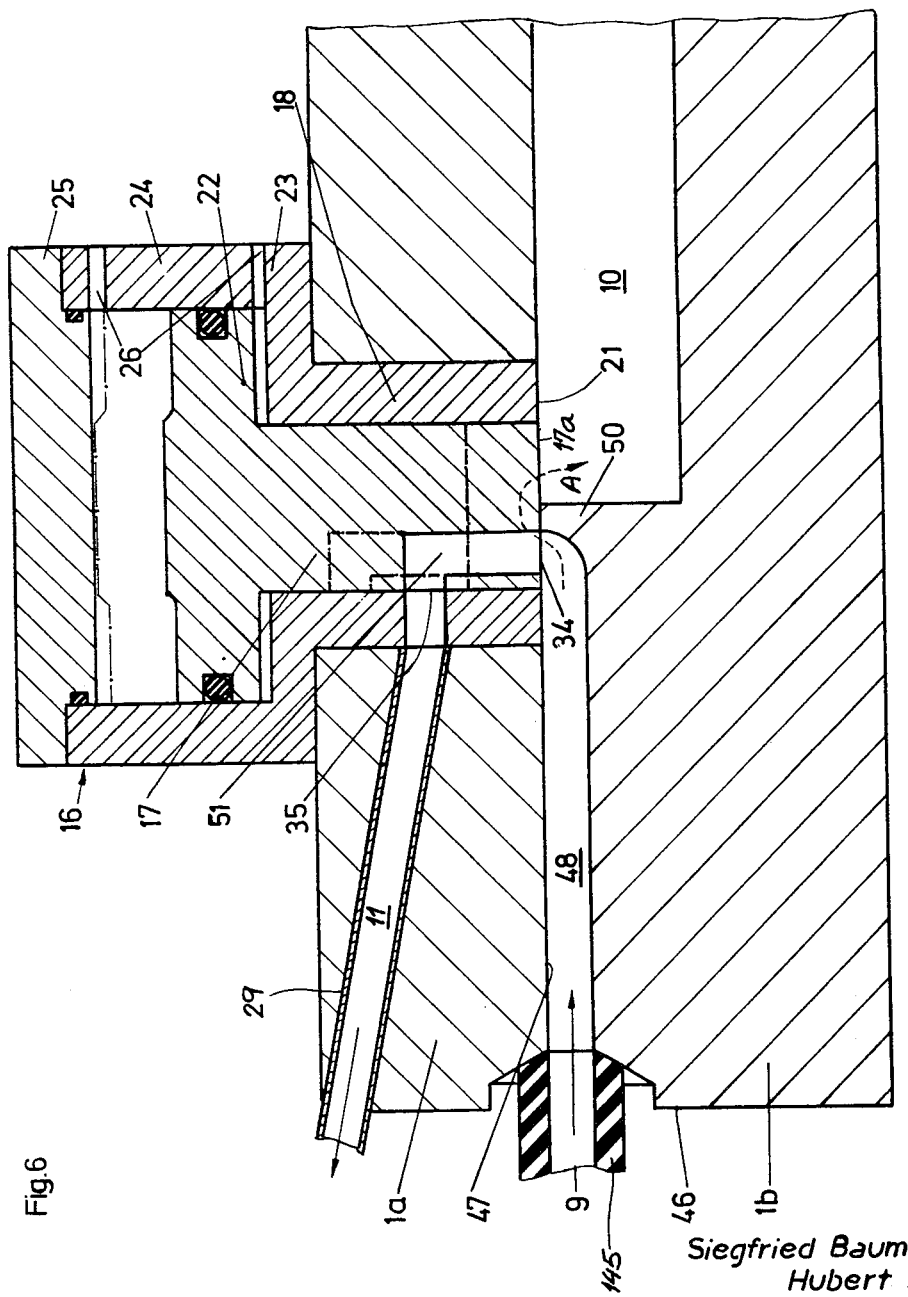

United States Patent Office  
3,674,398  
Patented July 4, 1972

3,674,398  
SCAVENGING SYSTEM FOR INJECTION-MOLDING MACHINE  
Siegfried Baumgartner, Sixtnitgern, Hubert Kindler and Rolf Lidl, Munich, and Heinrich Boden, Opladen, Germany, assignors to Krauss-Maffei Aktiengesellschaft, Munich, and Farbenfabriken Bayer Aktiengesellschaft, Leverkusen-Bayerwerk, Germany, fractional part interest to each  
Filed June 23, 1970, Ser. No. 49,026  
Claims priority, application Germany, June 24, 1969, P 19 31 921.2  
Int. Cl. B29f 1/00  
U.S. Cl. 425—159     21 Claims

ABSTRACT OF THE DISCLOSURE

An injection-molding machine for producing articles of foam plastic or the like has a mold cavity provided with an access opening at the end of a supply conduit for the admission of a combination of interacting components from a mixing chamber. A source of compressed air is connected to the mixing chamber via an inlet valve which is opened when the delivery of components to the mixing chamber is stopped; another valve unit at the end of the supply conduit then cuts off the access opening, after a delay sufficient to allow for the discharge of residual material from the mixing chamber into the cavity, and connects that conduit with an exhaust line directing the flow of scavenging air into the atmosphere.

---

Our present invention relates to an injection-molding machine, more particularly a machine designed for producing articles of foam plastic or the like in which several interacting components are fed to a mixing chamber just before being injected into a mold cavity.

The reactants delivered to the mixing chamber in such a system generally comprise two polymers, e.g. a polyol and a polyisocyanate, one of which is admixed with a foaming agent designed to impart a cellular structure to the molded article or at least to a less intensely heated core portion thereof. When injection is stopped, with the mold cavity filled only partially in order to provide room for the expansion of the foamed polymer, a residue of the reactive mixture remains in the mixing chamber and in the channel leading therefrom to the access opening or sprue of the cavity. This residual material tends to harden before the next molding cycle, with possible clogging of the injection channel. Some hardening also takes place during the feeding phase itself, particularly in the vicinity of the heated cavity walls.

The general object of our present invention is to provide means in such a machine for flushing residual polymeric material from the supply channel immediately after every feeding phase, thus before the hardening particles adhere firmly to the channel walls.

A more specific object is to provide means for clearing not only the supply channel but also the mixing chamber of a multicomponent injection system, as described above, preparatorily to another injection cycle.

A further object, allied with the preceding one, is to minimize the loss of molding material by sweeping the residue from the mixing chamber and the supply channel, or at least a substantial part of this residue, into the mold cavity at the end of each injection phase.

In accordance with our present invention we provide conduit means forming besides the usual injection channel leading from a supply of moldable plastic mass to the access opening of the mold cavity, an exhaust channel which branches off that injection channel in the vicinity of the access opening. A control system, such as a timer, alternately connects the inlet end of the injection channel to the supply means and to a source of scavenging fluid, preferably compressed air; a valve unit responsive to this control system connects the outlet end of the injection channel to the access opening during a feeding phase, substantially coinciding with the period of delivery of fresh material from the supply means, and to the exhaust channel in a scavenging phase to allow for the return of the high-pressure fluid to its source or (particularly in the case of air) to the atmosphere.

Advantageously, pursuant to another feature of our invention, the source of scavenging fluid is connected to the aforementioned mixing chamber which receives the interacting components via respective inputs; if the valve unit at the outlet end of the injection channel responds with a certain delay to the interruption of component feed to these inputs, and if this delay is just long enough to allow the front of the scavenging fluid to arrive at the branching point of the two conduits, most of the residual material present in the mixing chamber and the injection channel will be thrust into the partly filled mold cavity before the latter is cut off from the channel system.

In a preferred construction, according to a further feature of this invention, the valve unit comprises a reciprocable slider which may be designed as a piston guided in a surrounding cylinder. An annular land of the cylinder and an adjoining end face of the piston, lying substantially flush with that land in the scavenging position, may constitute or form part of a wall bounding the mold cavity during a curing stage partially coinciding with the scavenging phase; the access opening of the cavity is then represented by some or all of the area surrounded by the annular land, this area being blocked by the piston in its scavenging position. The injection channel may terminate at a discharge orifice in the cylinder wall, axially staggered with reference to an exit port in that wall leading to the exhaust channel, so as to be unblocked in the injection position in which the piston obstructs only the exit port. It is, however, also possible to dispose at least part of the injection channel within the piston itself letting that channel terminate in a generally transverse bore which in the scavenging position registers with the exit port or, advantageously, with two such ports leading to a pair of exhaust channels. The same bore may open directly into the mold cavity in the feeding position of the piston, the latter being then retracted into its scavenging position within the guide cylinder whose wall may also be recessed to establish a connection from the bore to the mold cavity in a rearward position of the piston.

Generally, the mold cavity will be formed in one of two separate mold portions which are moved apart to enable the discharge of the finished article from the mold. It will normally be convenient to dispose the piston cylinder in a stationary mold portion, together with adjacent parts of the injection and exhaust channels; we may, however, relocate the terminal part of the injection channel into the movable mold portion, advantageously in the form of a groove machined into the working surface of that portion confronting the stationary mold portion which overlies that groove in the closed-mold position. This groove, opening into the piston cylinder at an orifice separated from the mold cavity by a sill in contact with that cylinder during the scavenging phase, registers with a bore in the end face of the piston when the latter is advanced so as to lie flush with the surrounding land; in the same piston position, the bore communicates with the exit port so as to complete the scavenging circuit.

The above and other features of our invention will be described in detail hereinafter with reference to the accompanying drawing in which:

FIG. 4 is a view similar to FIG. 3, illustrating another embodiment;

FIG. 5, in a view generally similar to the two preceding figures, shows a partial modification of FIG. 4; and FIG. 6 is another axial sectional view illustrating a further embodiment.

Figure 1:
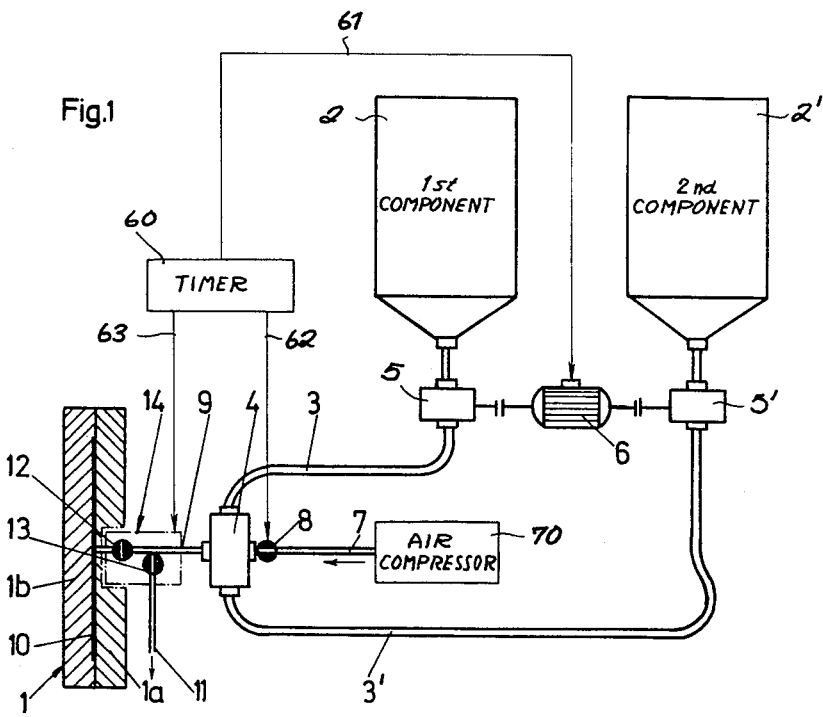
FIG. 1 is a diagrammatical view of an injection system according to our invention associated with a split mold.
Figure 2:
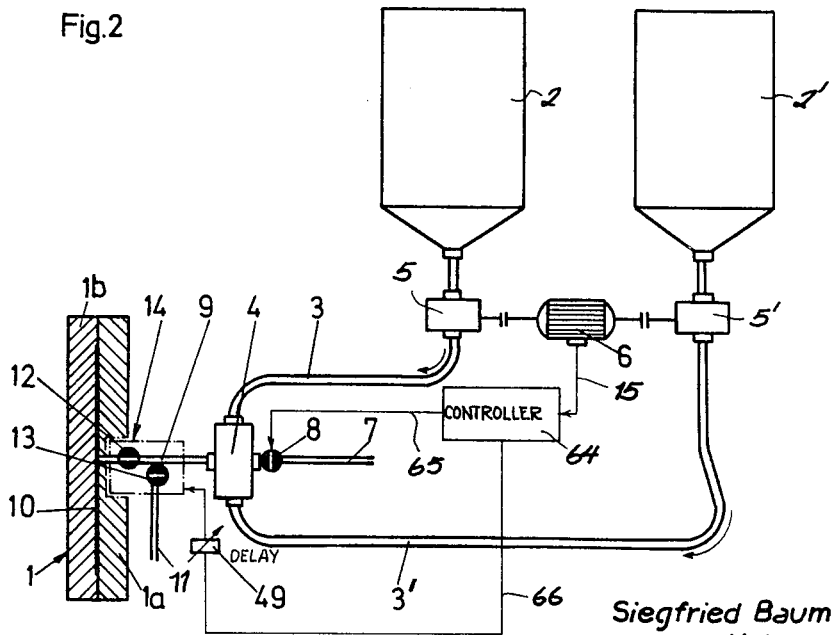
FIG. 2 is a view similar to FIG. 1, showing an alternate position of the system.

In FIGS. 1 and 2 we have shown a split mold 1, with a fixed half 1a and a movable half 1b, defining a mold cavity 10 designed to produce, for example, large-area plastic elements for pieces of furniture, vehicular bodies and the like. Two reservoirs 2 and 2' serve for the storage of respective components of a foamable mixture, e.g. a polyhydric alcohol and a polyisocyanate; either or both of these components may be admixed with a conventional foaming agent such as a Freon.

Supply line 3 and 3' lead from reservoirs 2 and 2' to respective inputs of a mixing chamber 4 to which the components are intermittently delivered with the aid of pumps 5, 5' driven from a common motor 6; pumps 5 and 5' are of the positive-displacement type, e.g. as used in the metering of liquid fuels, so that the component feed is discontinued whenever the pumps are stopped.

An air compressor 70 works into a conduit 7 which includes a shut-off valve 8 and opens into the mixing chamber 4 whence another conduit 9, serving as an injection channel, extends to the mold cavity 10 by way of mold portion 1a. A further conduit 11 forms an exhaust channel branching off the injection channel 9 just ahead of cavity 10, the junction of conduits 9 and 11 being located inside a valve unit 14 schematically illustrated in FIGS. 1 and 2 as comprising two separate valves 12 and 13 in the outlet end of conduit 9 and at the entrance of conduit 11, respectively.

In the position of FIG. 1, which represents a scavenging phase, valves 8 and 13 are open so that air from compressor 70 may flow through conduits 7, 9 and 11, as well as through mixing chamber 4 in series therewith, to flush out any residual plastic material lodged therein from a preceding injection or feeding phase. This feeding phase is illustrated in FIG. 2 where valves 8 and 13 are closed while valve 12 is open, pumps 5 and 5' being operated at the same time to deliver the respective reactants to mixing chamber 4 from which they are discharged into mold cavity 10.

The alternate opening and closing of valves 8, 12 and 13, in step with the starting and stopping of pumps 5, 5', may be controlled by a timer 60 as illustrated diagrammatically in FIG. 1; timer 60 controls, via a lead 61, the energization of motor 6 and, by way of other leads 62 and 63, the operation of valve 8 and valve unit 14. Advantageously, especially with a lengthy supply conduit 9, timer 60 delays the reversal of valves 12 and 13 with reference to the stopping of the pumps so that, with the valve 8 opening at the instant of such stoppage, the compressed air can drive the residual plastic mass before it into the cavity 10 which is only partly filled at that time; as soon as the front of that air stream arrives at the junction of channels 9 and 11, valve unit 14 is tripped to establish the position of FIG. 1 whereupon the air escapes freely into the atmosphere. A similar delay upon the restarting of the pumps, while not essential, minimizes the amount of air introduced into the mold cavity ahead of the new charge.

Timer 60 is only representative of a variety of control systems for the proper synchronization of pumps 5 and 5', valve 8 and unit 14. In FIG. 2, by way of example, valve 8 and unit 14 are shown to respond to a controller 64 receiving timing signals over a lead 15 from motor 6 which may be turned on and off manually or by a programmer not shown; these timing signals control the operation of valve 8 via a lead 65 and the reversal of valves 12 and 13 in unit 14 by way of a lead 66 including a preferably adjustable delay circuit 49 for the purpose described above. Unit 14 could also be switched by a pair of sensors responsive to the arrival of an air column near the outlet end of conduit 9, to initiate the scavenging phase, and to the resumption of component flow at the inputs of chamber 4, to initiate the feeding phase.

Reference will now be made to FIGS. 3–6 for a specific description of several embodiments of valve unit 14.

Figure 3:
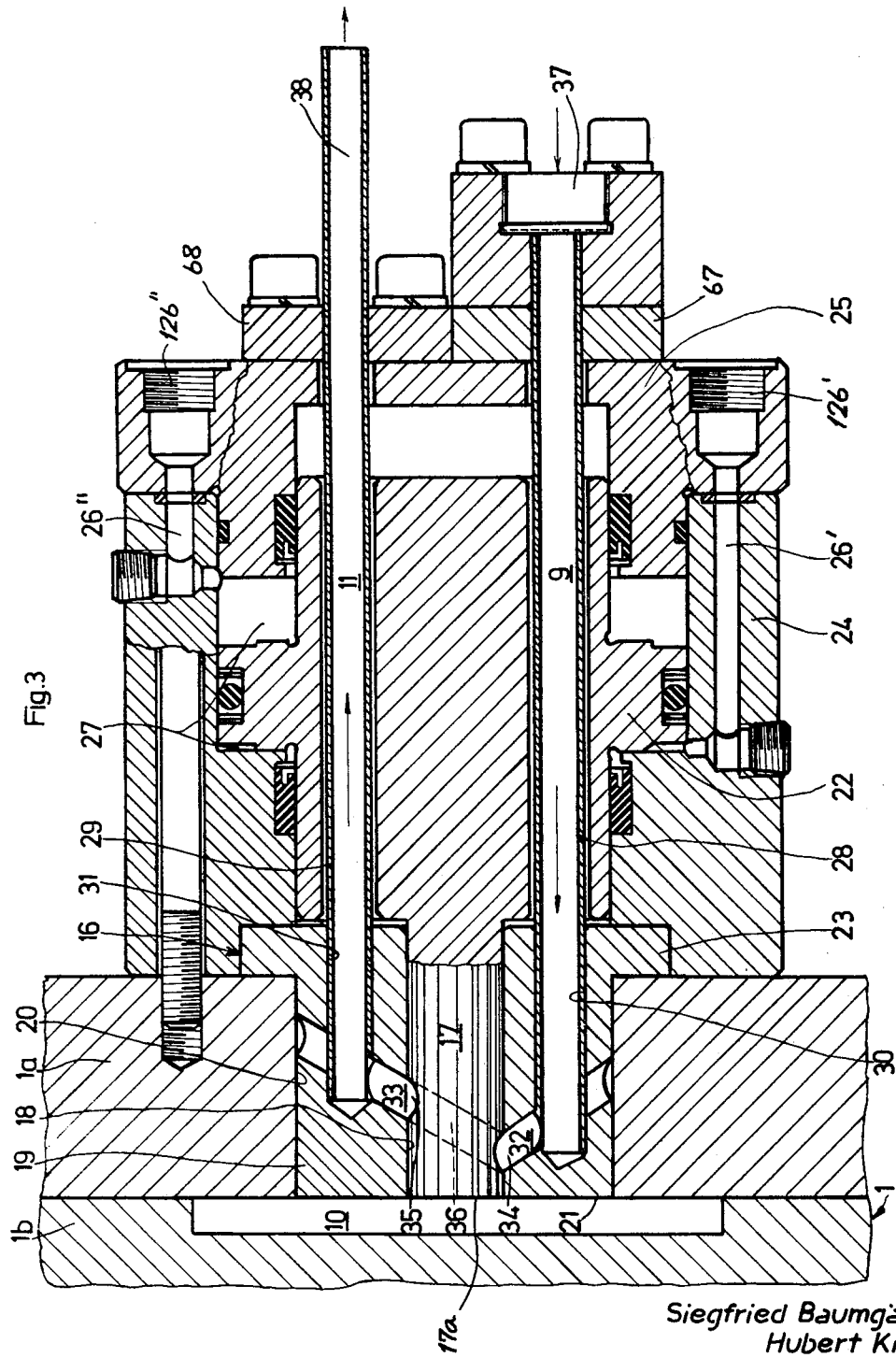
FIG. 3 is an axial sectional view of a slide valve and adjacent parts of a mold served through that valve by the injection system of FIGS. 1 and 2.

In the embodiment of FIG. 3 we show a slide valve, generally designated 16, comprising a piston 17 reciprocably guided in a bore 18 of a cylinder 19. The body of cylinder 19 is fixedly mounted in a bore 20 of mold portion 1a. In the illustrated forward position of piston 17, representing the aforedescribed scavenging position, an end face 17a of this piston lies flush with an annular land 21 of cylinder 19, the two surfaces 17a and 21 together forming part of a wall of mold cavity 10. A radial flange 22 of piston 17 constitutes a doubleacting piston in a fluid chamber 27 of a working cylinder 24 disposed rearwardly of an end flange 23 of guide cylinder 19. Working cylinder 24 is closed by a header 25 having ports 126', 126'' for the alternate admission of a hydraulic fluid at 26', 26'' to opposite sides of piston extension 22, thereby shifting the slide valve 16 between its two operating positions in response to command signals from a control circuit as described above with reference to FIG. 1 or FIG. 2.

The channels 9 and 11 diagrammatically illustrated in FIGS. 1 and 2 are here constituted by a pair of tubes 28 and 29 extending parallel to the piston axis through header 25, traversing with clearance an enlarged rearward portion of piston 17 and terminating in blind bores 30, 31 of cylinder 19. The inlet end 37 of conduit 28 and the outlet end 38 of conduit 29 are additionally supported in a pair of end plates 67, 68 on header 25. Bores 30 and 31 communicate with respective bores 32 and 33 extending obliquely within diametrically opposite wall portions of cylinder 19. Bore 32 terminates in an injection orifice 34 lying forwardly of an exit port 35 at the inner end of bore 33. A throughgoing oblique bore 36 in cylinder 17 interconnects the orifice 34 and the port 35 in the illustrated scavenging position. Upon a rearward retraction of piston 17, at the beginning of a new molding cycle, the piston uncovers the orifice 34 but not the port 35 whereby plastic mass from mixing chamber 4 (FIGS. 1 and 2) can enter the mold cavity 10 by way of conduit 9. At the end of the feeding phase, and after the aforedescribed delay with reference to the stoppage of the component supply, piston 17 returns to the scavenging position of FIG. 3 in which compressed air from source 70 (FIG. 1) passes through channels 9 and 11 by way of bores 32, 36 and 33.

The illustrated mounting of tubes 28 and 29, with ends projecting beyond header 25, not only simplifies the problem of coupling the conduit 9 to its supply line but also facilitates the removal of both tubes for the purpose of thorough cleaning or replacement.

The system of FIG. 4, in which analogous elements have been designated by the same numerals as in FIG. 3, differs from the preceding embodiment mainly by the axial positioning of supply tube 28 in piston 17 and by the duplication of the exhaust channel in the form of two conduits 11', 11'' formed by tubes 29', 29'' on opposite sides of the piston axis. Central tube 28 communicates with the mixing chamber through a flexible, preferably elastic conduit 52 secured to its inlet end by a coupling 45. The outlet end of tube 28 communicates permanently with a transverse bore 39 near the forward face 17a of piston 17. In the scavenging position illustrated in full lines, in which this piston is retracted to the rearward end of its stroke, face 17a is flush with land 21 of cylinder 19; in this position the two open ends of bore 39 register with respective exit ports 35', 35" communicating via bores 33', 33" with channels 11', 11". In its alternate or feeding position (dot-dash lines), piston 17 projects partly into the mold cavity 10 to expose the bore 39 which then opens directly into the cavity.

In FIG. 5 we show a similar dual exhaust 11', 11" with tubes 29' and 29" diverging, however, from the piston axis just beyond guide cylinder 19 without passing through any part of piston 17. Injection channel 9 is here formed by an axial bore in the piston and a short tubing 128 connected via coupling 45 with flexible supply conduit 52. Piston 17, which is only slightly stepped in this embodiment, is held against rotation by pins 43 guided in flutes 44 of a ring 53 supported by struts 54 on a rearward extension 55 of guide cylinder 19. Working cylinder 24 of FIGS. 3 and 4 has been replaced by a hydraulic cylinder 124 mounted on extension 55. Naturally, channel 9 could also be extended axially to the rear beyond cylinder 124, with relocation of junction 45 and conduit 52 to the end of the piston in the general manner illustrated in FIG. 4.

In the full-line position of FIG. 5, representing the feeding position, piston 17 is retracted into cylinder 19 so that its transverse bore 39 registers with the rear ends of a pair of diametrically opposite recesses 41', 41" formed in the inner peripheral wall surface of this cylinder. The front end of these recesses are exposed so as to connect with mold cavity 10 whose access opening, as in the preceding two figures, is framed by the land 21. Recesses 41' and 41" are a pair of relatively narrow axially oriented grooves and do not extend around the entire periphery of the piston in order to avoid the formation of pockets in which a residue of molding material could remain after each injection. In its alternate scavenging position (dot-dash lines) the piston again lines up with the cavity wall of mold portion 1a, the bore 39 then registering with the front ends of recesses 41', 42" whose rear ends at that instant communicate with the front ends of two similar recesses or grooves 42', 42" machined into the piston 17 on diametrically opposite sides of its peripheral surface. In that position, the rear ends of grooves 42' and 42" register with exit ports 35' and 35" so as to complete the scavenging circuit through exhaust channels 11' and 11".

In the embodiment of FIG. 6, finally, the injection channel 9 terminates at the movable mold half 1b in a groove 48 machined into the working surface of this mold portion. A lateral surface 46 of mold half 1b is recessed, as is a corresponding surface of mold half 1a, to accommodate an end of a flexible supply tube 145 which, like tube 45 of FIGS. 4 and 5, advantageously consists of elastic material. In the closed position of the mold, illustrated in FIG. 6, groove 48 is overlain by the confronting surface 47 of mold half 1a which, together with parts of land 21 and piston face 17a, forms one of the boundaries of cavity 10 in the scavening position of piston 17 illustrated in full lines. In that position, injection orifice 34 at the inner end of groove 48 registers with a bore 51 which passes mostly axially through the piston and terminates at the level of exit port 35 communicating with exit channel 11. The latter channel, in this embodiment, is formed by a tube 29 partly received in mold half 1a.

A sill 50, separating orifice 34 from mold cavity 10, is engaged by piston face 17a in the scavenging position but is disengaged from that face in the feeding position illustrated in dot-dash lines, thereby allowing plastic mass from channel 9 to flow into the access opening of the cavity as illustrated by an arrow A. Thus, the operation of the system of FIG. 6 is analogous to that of the preceding embodiments.

Piston 17 should be received with close fit in cylinder 18 and should be bounded by a sharp edge at the face 17a to scrape off any polymeric residue adhering to the cylinder wall. Owing to the positioning of the piston at the very boundary of the mold cavity, and by virtue of the utilization of the entire injection channel as part of the scavenging circuit, all remnants of molding material not swept into the mold cavity are flushed from the system before any new injection cycle.

We claim:

1. An injection-molding machine comprising a mold with a cavity provided with an excess opening; a mixing chamber with a plurality of inputs; supply means communicating with said inputs for delivering thereto respective interacting components of a moldable plastic mass; conduit means forming an injection channel leading from said mixing chamber to said access opening and an exhaust channel branching off said injection channel in the vicinity of said access opening; a source of scavenging fluid communicating with said mixing chamber; control means for disconnecting said mixing chamber alternately from said source in a feeding phase and from said supply means in a scavenging phase; and valve means responsive to said control means for connecting an outlet end of said injection channel to said access opening in said feeding phase and to said exhaust channel in said scavenging phase.

2. A machine as defined in claim 1 wherein said valve means is operable by said control means with a delay sufficient to let at least a substantial part of said residual reaction products enter said access opening prior to disconnection thereof from said injection channel.

3. A machine as defined in claim 1 wherein said control means includes a positive-displacement pump in each of said inputs.

4. A machine as defined in claim 1 wherein said valve means comprises a slider reciprocable between a feeding position and a scavenging position, said slider blocking said access opening in said scavenging position while giving passage to said fluid from said injection channel to said exhaust channel.

5. A machine as defined in claim 4 wherein said cavity is bounded by a wall formed at least in part by an end face of said slider in said scavenging position.

6. A machine as defined in claim 5 wherein said valve means further comprises a cylinder open toward said cavity and provided with at least one peripheral port leading to one of said channels, said slider being a piston guided in said cylinder and provided with a bore registering with said port in one of said positions.

7. A machine as defined in claim 6 wherein said cylinder has an annular land surrounding said access opening and forming at least in part an element of said wall, said end face being substantially flush with said land in said scavenging position.

8. A machine as defined in claim 7 wherein said port is the entrance of said exhaust channel, said injection channel communicating with said bore at least in said scavenging position.

9. A machine as defined in claim 8 wherein said injection channel has an exit orifice in said cylinder positioned to communicate with said bore in said scavenging position only, said orifice and said port being axially staggered with said port farther from said cavity than said orifice, said piston in said feeding position obstructing said port while leaving said orifice unobstructed.

10. A machine as defined in claim 8 wherein said injection channel passes at least in its terminal part through said piston and is permanently connected with said bore.

11. A machine as defined in claim 10 wherein said piston extends into said cavity in said feeding position to an extent sufficient to uncover said bore whereby the latter opens directly into said cavity.

12. A machine as defined in claim 10 wherein said cylinder is provided with at least one inner peripheral recess forwardly of said port terminating short of said land for obstruction by said piston in said scavenging position, said piston being withdrawn in said feeding position to an extent sufficient to clear part of said recess while letting another part thereof communiacte with said bore.

13. A machine as defined in claim 12 wherein said piston is provided with a peripheral groove spanning said recess and said port in said scavenging position, said bore registering with said recess in said scavenging position.

14. A machine as defined in claim 10 wherein said bore extends transversely through said piston and has a pair of open ends on opposite sides thereof, said port and said exhaust channel being duplicated on opposite sides of said cylinder for communication with said open ends, respectively, in said scavenging position.

15. A machine as defined in claim 8 wherein said injection channel terminates inside said mold at an orifice confronting said end face with interposition of a sill between said orifice and said access opening, said bore opening onto said end face for registry with said orifice in said scavenging position, said piston engaging said sill in said scavenging position.

16. A machine as defined in claim 15 wherein said mold comprises two separable portions, one of said portions containing said cylinder, the other of said portions forming said cavity and said sill.

17. A machine as defined in claim 16 wherein a terminal part of said injection channel is a groove in said other of said portions overlain by said one of said portions in a closed position of the mold.

18. A machine as defined in claim 4 wherein said valve means comprises a working cylinder surrounding said slider, the latter being provided with a piston extension received in said working cylinder for actuation by a driving fluid.

19. A machine as defined in claim 18 wherein said working cylinder is provided with a transverse end plate, at least one of said channels including a tube transversing said end plate.

20. An injection-molding machine comprising a mold with a cavity provided with an access opening; supply means for a moldable plastic mass; conduit means forming an injection channel leading from said supply means to said access opening and an exhaust channel branching off said injection channel in the vicinity of said access opening; a source of scavenging fluid; control means for alternately connecting an inlet end of said injection channel to said supply means in a feeding phase and to said source in a scavenging phase; and valve means including a slider responsive to said control means for connecting an outlet end of said injection channel to said access opening in said feeding phase and to said exhaust channel in said scavenging phase; said slider being reciprocable between a feeding position and a scavenging position, said cavity being bounded by a wall formed at least in part by an end face of said slider in said scavenging position in which said slider blocks said access opening while giving passage to said fluid from said injection channel to said exhaust channel.

21. An injection-molding machine comprising a mold with a cavity provided with an access opening; supply means for a moldable plastic mass; conduit means forming an injection channel leading from said supply means to said access opening and an exhaust channel branching off said injection channel in the vicinity of said access opening; a source of scavenging fluid; control means for alternately connecting an inlet end of said injection channel to said supply means in a feeding phase and to said source in a scavenging phase; and valve means including a slider responsive to said control means for connecting an outlet end of said injection channel to said access opening in said feeding phase and to said exhaust channel in said scavenging phase; said slider being reciprocable between a feeding position and a scavenging position while giving passage to said fluid from said injection channel to said exhaust channel; said valve means further including a working cylinder surrounding said slider, the latter being provided with a piston extension received in said working cylinder for actuation by a driving fluid.

References Cited

UNITED STATES PATENTS

| | | | |
|---|---|---|---|
| 3,102,304 | 9/1963 | Divers | 18—Dig. 51 |
| 3,137,038 | 6/1964 | Maynard | 18—2 RA X |
| 2,898,626 | 8/1959 | Alderfer et al. | 18—4 BX |
| 3,111,717 | 11/1963 | Bodkins | 18—Dig. 51 |

H. A. KILBY, Jr., Primary Examiner

U.S. Cl. X.R.
425—244, 207, 130